Aug. 11, 1936.  J. A. ZUBLIN  2,050,989
EARTH BORING TOOL WITH ROLLING CUTTERS
Filed Dec. 26, 1935   2 Sheets-Sheet 1

John A. Zublin, Inventor

By J. W. Rodgers, Attorney

Aug. 11, 1936.      J. A. ZUBLIN      2,050,989
EARTH BORING TOOL WITH ROLLING CUTTERS
Filed Dec. 26, 1935      2 Sheets-Sheet 2

Inventor
John A. Zublin
By
Attorney

Patented Aug. 11, 1936

2,050,989

UNITED STATES PATENT OFFICE 2,050,989

EARTH BORING TOOL WITH ROLLING CUTTERS

John A. Zublin, Los Angeles, Calif.

Application December 26, 1935, Serial No. 56,252

6 Claims. (Cl. 255—71)

The present invention relates generally to rotary earth boring tools such as are used to drill oil wells, but more especially to drill bits having rotating cutters and adapted to penetration of relatively hard formations.

For reasons that are well known in the art, successful drill bits for use in rock and other hard formations almost always have rotating cutters since they produce the best kind of drilling motion. However, there are conflicting requirements that make design difficult. For best penetration, it is necessary to have only a minimum portion of the cutters in contact with the formation at any time, as higher pressure per unit area increases the penetration of the teeth. On the other hand, to keep the cost of drilling within reason by giving a long life to the bit, it is necessary to provide a maximum of cutting teeth on the bit since the drilling life of a bit is generally proportional to the total number and size of cutting teeth available to cut the formation; and an increase in the total number of teeth has usually been accompanied by a like increase in the number of teeth cutting at any one time.

It is thus apparent that the ideal bit has a large total amount of cutting surface but has only a very small part of that surface "active", or in drilling contact, at any one time, the remainder of the cutting surface being, in effect "in reserve", since it also does its share of the cutting after the first "active" portion moves out of contact with the formation. In roller or cone bits of the present types, all the roller or cone cutters are in simultaneous engagement with the formation, so the "reserve" cutting surface is limited to that portion of each cutter not so engaged, and amounts to but a few, perhaps three to six, times the "active" cutting surface, whereas both the efficiency and the life of the bit would be increased by increasing the ratio between the reserve and active portions of the cutting surface.

Another disadvantage of the conventional roller or cone bit having but a small number of rolling cutters is that each cutter rolls in the same definite path concentric to the bit axis as the bit is rotated. Since often only one cutter, and rarely more than two cutters, cover a given area, the failure of one or two cutters holds up the entire bit when there is no additional cutter to perform cutting operations in the area covered by the broken rollers or cones.

Thus it is a general object of my invention both to decrease the amount of active cutting area which is at any one time in cutting position, and to increase the amount of reserve area. These changes have the effect of increasing the speed of penetration, and also of lengthening the bit's life since there is more aggregate cutting surface to be worn.

It is also an object of the invention to provide a bit which not only has the usual reserve cutting area on each cutter, but also has a sufficiently large number of cutters that several entire cutters are in reserve, and, as a whole, are each successively brought into cutting position and then returned to the reserve or non-cutting position. By having entire cutters in reserve, the ratio between "reserve" and "active" portions of the aggregate cutting surface is increased to several times that possible when all cutters are simultaneously in contact with the formation.

A further object of the invention is to provide a bit having a plurality of cutters which are moved over varying paths non-concentric relative to the bore hole center, so that all cutters eventually move across substantially all points on the hole bottom and the complete failure of one cutter does not prevent removal of formation at any point.

Another object is to provide a bit having the above characteristics in which the roller cutters contact the formation with a substantially true rolling motion throughout all, or substantially all, of their engagement with the formation, thus disintegrating the formation with a crushing action.

Another object is to provide a bit in which the cutters are moved successively from cutting position upward to a position where they are cleaned by the circulation fluid and then returned downwardly to the digging position.

These objects are attained in the bit of my invention by providing the bit shank, which is attached to the string of drill pipe for rotation thereby about a vertical axis, with a wheel-like cutter carrier mounted to rotate in a plane which is preferably vertical or generally so. Around the periphery of this cutter carrier is mounted a plurality of rolling cutters of any suitable type which extend radially beyond the carrier, and, as the carrier revolves, are brought successively into drilling contact with the earth formation to be cut away. The individual cutters are preferably, though not necessarily, mounted so that their axes of revolution are slightly inclined to the plane or revolution of the carrier, so that not only is the motion of the cutter over the formation more truly rolling but that the cutter moving over the formation takes a path which causes the carrier to revolve about its own axis as the shank is rotated.

How the above and other objects and advantages of my invention are attained will be more readily understood by reference to the following description and the annexed drawings, in which.

Figure 1:
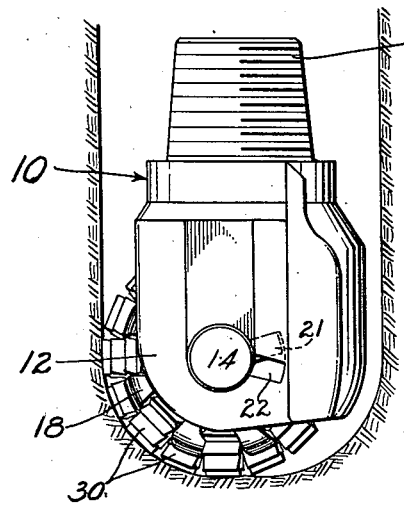
Fig. 1 is a side elevation of a bit constructed according to my invention.

There is shown in Fig. 1 a bit provided with a shank, indicated at 10, having on its upper end a threaded pin 11 by means of which the shank is attached to a string of drill pipe or drill stem for rotation thereby about a vertical axis. The lower portion of the shank is formed with two depending legs 12 which carry horizontal bearing shaft 14. On the back side of the bit, legs 12 are preferably joined by an integrally formed hood 15, advantages of which will be later mentioned.

The horizontal shaft 14 is preferably non-rotatably mounted on the shank and forms a bearing for the wheel-like cutter carrier 18 which is mounted to rotate relative to the shank and in a vertical plane. To reduce friction and allow the carrier to turn more freely, there may be provided roller bearings 19 between shaft 14 and the carrier, and ball bearings 20 for taking the thrust between the carrier and the shank body. In order to securely hold bearing 14 in position after the bit is assembled, it is provided with some locking means which may take various forms, though it is here shown as comprising a fixed lug 21 extending radially near one end of shaft 14 and adapted to be received in an L-shaped slot 22 in one leg 12 of the bit. As shaft 14 is inserted axially, lug 21 enters the horizontal end of slot 22, and when the shaft is properly seated it is rotated slightly to the position shown in Fig. 1, where the lug is engaged by the inner vertical end of slot 22 and the bearing is held against axial movement. When the bearing is in this position, a transverse hole 23 in the opposite end of bearing 14 is brought into a horizontal position and aligned with a similar bore 24 in the shank so that locking pin 25 may be inserted through bores 24 and 23 to hold bearing 14 against rotation. The shank is provided with a recess at 26, intermediate the ends of pin 25 so that by striking that portion of the pin exposed in the recess a sharp blow the pin is bent as shown in Fig. 4 to prevent its longitudinal displacement from bore 24.

Figure 4:
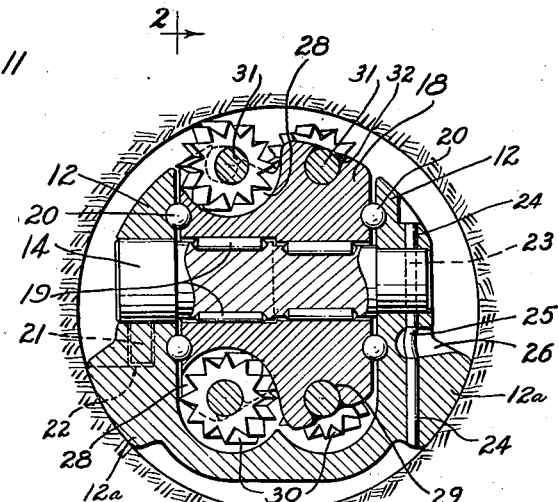
Fig. 4 is a horizontal section of the bit on line 4—4 of Fig. 2, but rotated 90° to the right.
Figure 2:
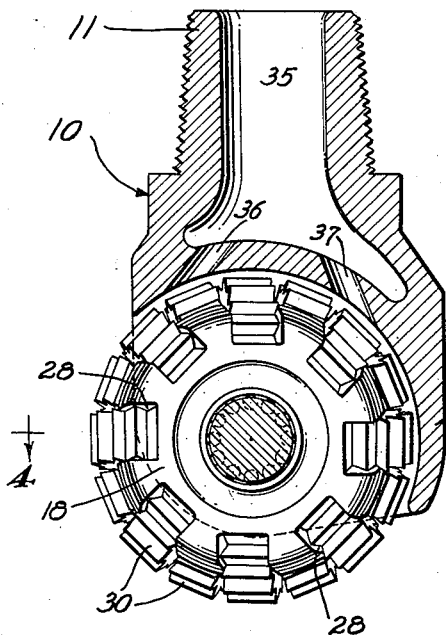
Fig. 2 is a vertical section through the bit on line 2—2 of Fig. 4, showing the cutter carrier in elevation.

As may be seen from Figs. 2 and 4, cutter carrier 18 is provided with a plurality of radial slots 28 spaced about its circumference. In each of these radial slots there is placed a cutter 30, of any suitable type, mounted to rotate on a pin 31. Pins 31 are placed in shallow grooves 29 in the cutter carrier and welded to the carrier body to hold them in place, the welds being indicated at 32.

Figure 3:
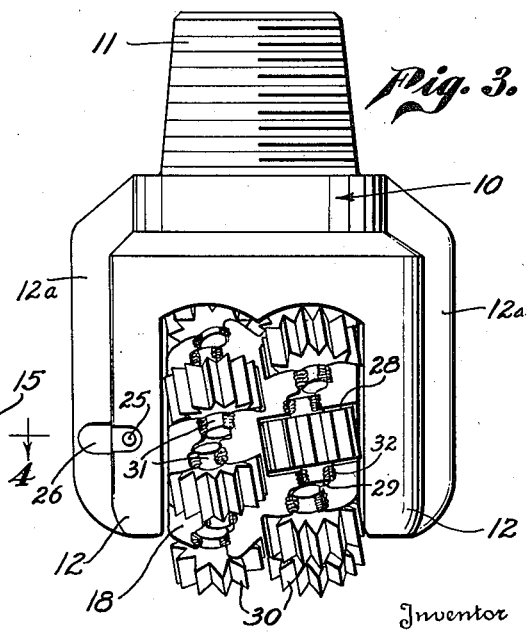
Fig. 3 is a front elevation of the bit as viewed from the left of Fig. 1.

Rolling cutters 30 may be of any desired size or shape and have any suitable tooth formation, but are here shown as having teeth extending parallel to the axis of cutter rotation, while the cutters themselves are arranged in two parallel rows of eight cutters about the periphery of the cutter carrier, the rows being staggered, that is, the cutters of one row occupy the intervals between cutters of the other row, as shown in Figs. 2 and 3. Cutters 30 lie substantially entirely between the parallel, vertical sides of carrier 18, or between the sides projected, but extend radially beyond the carrier in order to contact the earth formation to be drilled. As may be seen from Fig. 1, the horizontal axis of bearing 14 passes to one side of the vertical axis of the bit so that engagement of the cutters with the formation takes place only on that one side of the bit's vertical axis.

Cutter bearing pins 31 are preferably not placed at right angles to the axis of rotation of the cutter carrier but are slightly inclined to the sides of the carrier, as may be seen in Fig. 3, so that the cutters rotate about axes always slightly inclined to the vertical plane of carrier revolution. The cutters are inclined in this manner so that they will cause the carrier to revolve by their movement over the formation. From Fig. 1 it will be seen that the cutters first contact the formation at a point substantially level with the axis of bearing 14, that is with the center of the carrier, and that by revolving shank 10 in a clockwise manner about its vertical axis, the cutters as they contact the formation will revolve about their own axes so as to move over the formation with a true rolling motion. As the cutters seen in Fig. 3 initially engage the formation they tend to roll in a path downwardly inclined to the left because of the inclination from the vertical of their axes of revolution, as described above, and they continue to roll on this downwardly inclined path in contact with the formation until they reach a point at the bottom of the hole substantially directly beneath the axis of bearing 14, when they are moved out of engagement with the formation, as will be clearly seen from Fig. 1. Because the teeth tend to follow this downwardly inclined path rather than a horizontal path, the downward component of the cutter motion causes the cutter carrier to revolve in a counter-clockwise direction as viewed in Figs. 1 and 2, and this rotation of the carrier brings the successive cutters into contact with the formation and, after they have reached the bottom of the hole, moves them successively out of engagement with the formation.

The direction of rotation of carrier 18 is determined by the direction of inclination of cutters 30. The cutters are preferably inclined as shown in order to produce counter-clockwise revolution of the carrier since this permits the cutters to operate during a downward movement over the formation. If, however, the inclination of the cutters were reversed and the shank rotated in the same direction about its vertical axis, then the carrier would move in a clockwise direction, as viewed in the drawings, with the cutters initially contacting the formation at the bottom of the hole and rolling upwardly while cutting. It will also be realized that the speed of rotation of the carrier, and consequently the path of the cutters, may be varied by changing the inclination of the cutters to the plane of carrier revolution.

In order to prevent inadvertently assembling the bit with the cutter carrier reversed so that the cutters have the opposite inclination from that shown, the bore through the carrier is made with two different diameters and bearing 16 is provided with a step as shown in Fig. 4. Thus the bit can only be assembled with the parts in the proper relationship.

The exact path followed by any given cutter will vary according to the speeds of rotation of the shank and the cutter carrier, but in general the path commencing at the point of initial contact will be a spiral following the surface of the formation and decreasing in radius downwardly to the point beneath the center of the carrier where the cutter ceases contact with the formation. The cutters do not roll on any fixed path concentric with the center of the hole and do not tend to follow a preceding path. Consequently the failure or loss of one or two cutters will not stop the bit from drilling, since it is only a question of time until other cutters will go over those portions of the hole which would have been cut by the missing cutters had they been present, for all cutters at one time or another reach all portions of the hole.

In order to take the reaction to the thrust of the cutters and hold them in continual contact with the sides of the hole being drilled, shank 10 is provided with one or more ribs 12a, here shown as being two in number and symmetrically placed, these ribs bearing against the opposite side of the hole.

The upper end of shank 10 is formed with an internal fluid passage 35 which receives circulation fluid from the drill stem, and this passage is provided with two discharge outlets 36 and 37 which direct a stream of fluid against the cutters as they are moved upwardly from digging position and returned to their point of initial formation contact. Passages 36 and 37 are inclined oppositely in order to clean both sides of the cutters, and hood 15 confines the stream issuing from passage 37 so as to aid the cleaning action.

From this construction it will be seen that not only has each roller only a portion of its teeth active or in cutting engagement at any given time with the remainder of the teeth in reserve or non-cutting position, but that the bit as a whole has only a portion of its cutters active at any time and has a large reserve of entire cutters which are in the non-cutting position. While the proportion of the total cutters which is active or engaged with the formation will vary with the number of cutters and their arrangement on the carrier yet it will be seen from the construction of the bit that the number of active cutters will, in general, always be less than one-half of the total number of cutters. In the form illustrated, there are eight cutters in each of two rows making a total of sixteen cutters, of which only five are active at one time so that the number in reserve is approximately twice the number of active cutters.

Figures 5, 6:
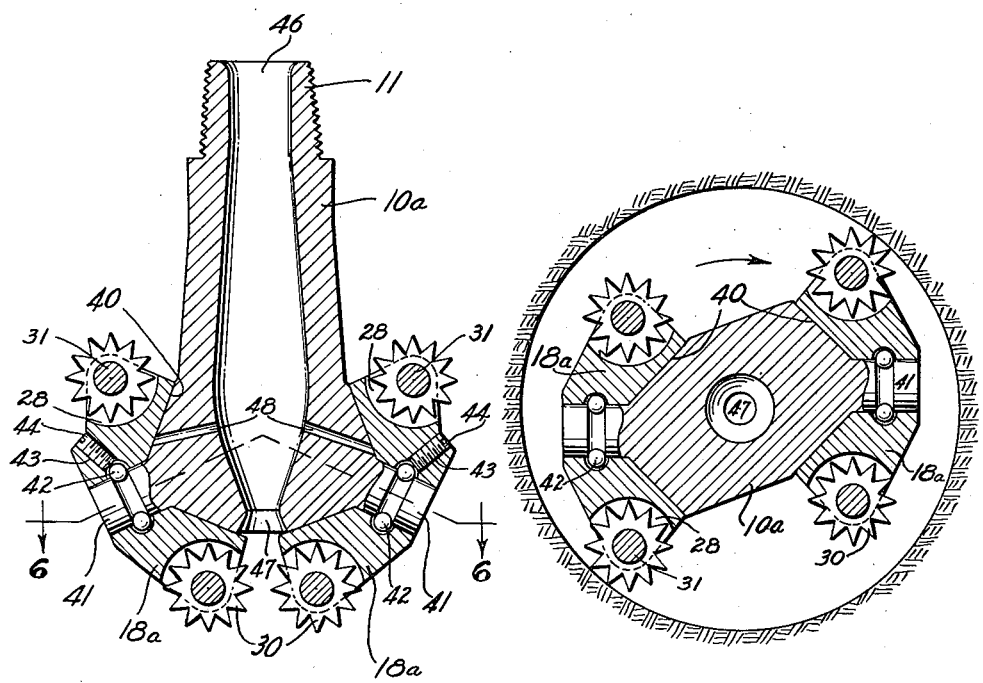
Fig. 5 is a vertical section through a variational form of bit having two cutter carriers; and, Fig. 6 is a section on line 6—6 of Fig. 5.

A variational form of bit embodying these same principles of operation, is shown in Figs. 5 and 6. The shank 10a has a pair of integrally formed bearings on opposite sides of the shank, each bearing including a conical thrust bearing face 40 and a journal bearing pin 41, these bearings being slightly inclined equally and oppositely to the horizontal. On each bearing is mounted a cutter carrier 18a which revolves about pin 41 in a plane inclined thereto. The cutter carrier has a central bore formed with a combination of conical and cylindrical bearing surface which are complementary to and engage respectively the corresponding surfaces 40, 41 on the shank. Each carrier 18a is held on its bearing by a plurality of balls 42 in a ball channel formed by matching grooves in pin 41 and the carrier body. The balls are introduced to the channel, after the carrier has been placed in assembled position, through a passage 43 in the carrier body, screw 44 being placed in the passage to keep the balls in place.

Shank 10a has an internal passage 46 for circulation fluid that discharges from a central orifice 47 against the rolling cutters in their bottom position. Auxiliary passages 48 conduct fluid from the main passage to the bearing faces for lubrication purposes.

Like carrier 18, carrier 18a has a plurality of radial slots 28 each of which has a cutter 30 rotatably mounted on a pin 31. However, the carrier 18a has only a single row of cutters, there being two such carriers to provide the same number of cutters as in the bit first described.

The cutter bearings 31 are placed at right angles to the axis of carrier rotation and all lie in a single plane parallel to the plane of carrier revolution. From Fig. 6 it will be seen that the cutters first contact the formation at points horizontally opposite the carrier bearing. When the bit rotates clockwise, as viewed in Fig. 6, the cutters are in the same position relative to the sides of the well bore as the cutters of Fig. 4; and the two carriers will revolve, oppositely relative to each other. The cutting action is as described above, each cutter traversing a downwardly inclined spiral path over the formation. Since the cutters on the two carriers contact the well bore at diametrically opposed points (Fig. 6) each carrier takes the thrust of the other, and ribs 12a on the shank or similar members may be dispensed with.

From the foregoing it will be seen that various bits with one or more cutter carriers may be made embodying my invention. The cutters are so placed on the bit that they roll over the formation in a spiral path, since each axis of cutter revolution is inclined to the vertical when it contacts the formation horizontally opposite the carrier axis. This positioning of the cutters is effected by placing the various axes of revolution in certain relationships to one another. The rotational axis of the bit shank may be considered as remaining vertical. The rotational axis of the cutter carrier is then preferably perpendicular either to the shank axis or to the cutter axis and is inclined to the other one of these two axes.

Having described various embodiments of my invention, it will be clear how various other embodiments may be constructed without departing from the spirit and scope of the invention, and therefore the annexed claims are to be considered as illustrative of rather than restrictive upon the broader aspects of my invention.

Attention is directed to my copending application Ser. No. 71,600 filed March 30, 1936, wherein I have generic claims covering the species described and claimed herein.

I claim as my invention:

1. In a rotary earth boring tool, the combination of a shank adapted to be rotated about a vertical axis by a drill stem; a cutter carrier rotatably mounted on the shank; and a plurality of individual cutters rotatably mounted on the cutter carrier for successive intermittent cutting contact with the formation upon rotation of the carrier, said cutters being mounted to revolve about axes which are inclined with respect to the plane of revolution of the carrier and which do not intersect the axis of revolution of the carrier, so that the cutters rolling over the formation cause the carrier to rotate as the shank is rotated about its axis.

2. In a rotary earth boring tool, the combination of a shank adapted to be rotated about a vertical axis by a drill stem; a wheel-like cutter carrier rotatably mounted on the shank to revolve in a vertical plane about a horizontal axis; and a plurality of circumferentially spaced individual cutters rotatably mounted on the cutter carrier and brought successively into intermittent cutting contact with the formation by rotation of the carrier, said cutters being mounted to rotate about axes which are inclined with respect to the vertical plane of revolution of the carrier so that the cutters rolling over the formation follow a spiral path and cause the carrier to rotate as the shank is rotated about its axis.

3. In a rotary earth boring tool, the combination of a shank adapted to be rotated about a vertical axis by a drill stem; a cutter carrier rotatably mounted on the shank to revolve about a second axis; and an individual cutter rotatably mounted on the periphery of the carrier to revolve about a third axis, and brought into intermittent cutting contact with the formation upon rotation of the carrier; the rotational axis of the carrier being perpendicular to one of said two other axes and inclined to the remaining axis.

4. In a rotary earth boring tool, the combination of a shank adapted to be rotated about a vertical axis by a drill stem; a cutter carrier rotatably mounted on the shank; and a plurality of individual cutters rotatably mounted on the cutter carrier for successive intermittent cutting contact with the formation upon rotation of the carrier; the axes of rotation of the carrier and of the individual cutters being so disposed that as the shank rotates, each cutter as it rolls over the formation traverses a generally spiral path which is inclined downwardly from a point substantially level with the center of the carrier to a point substantially directly beneath the center of the carrier, the vertical component of the cutter movement causing the carrier to revolve.

5. In a rotary earth boring tool, the combination of a shank adapted to be rotated about a vertical axis by a drill stem; a plurality of cutter carriers rotatably mounted on the shank to revolve in generally vertical planes about axes inclined slightly to the horizontal; and a plurality of individual cutters rotatably mounted on each of the cutter carriers for successive intermittent digging contact with the formation upon rotation of the carriers; said cutters being mounted to rotate about axes lying in the plane of rotation of the carrier upon which they are mounted so that the cutters rolling over the formation follow a spiral path and cause the carrier to rotate as the shank is rotated about its axis.

6. In a rotary earth boring tool, the combination of a shank adapted to be rotated about a vertical axis by a drill stem; a pair of bearings on the shank, each bearing comprising thrust and journal bearing surfaces; a cutter carrier rotatably mounted on each of the bearings, said carrier having a central bore comprising bearing surfaces complementary to and engaging the thrust and journal bearing surfaces of the shank; and a plurality of individual cutters rotatably mounted on each cutter carrier for successive intermittent digging contact with the formation upon rotation of the carrier.

JOHN A. ZUBLIN.